United States Patent

Drayton

[15] 3,679,175
[45] July 25, 1972

[54] ENERGY ABSORBING TIE-DOWN WINCH
[72] Inventor: Walker E. Drayton, York, Pa.
[73] Assignee: American Chain & Cable Company, Inc., New York, N.Y.
[22] Filed: Nov. 24, 1969
[21] Appl. No.: 879,078

[52] U.S. Cl............................254/51, 105/368 T, 248/361, 254/164, 280/179.1
[51] Int. Cl..........................................B66f 1/00, A63b 61/04
[58] Field of Search.............................254/51, 53, 164, 165; 280/179.1, 368 T; 105/369 A; 248/119, 361

[56] References Cited

UNITED STATES PATENTS

| | | |
|---|---|---|
| 2,608,383 | 8/1952 | Edelblute...........................254/164 |
| 2,946,563 | 7/1960 | Eaton...............................254/164 |
| 3,051,410 | 8/1962 | Miles.............................254/165 X |
| 3,127,151 | 3/1964 | Klawitter..........................254/164 |

Primary Examiner—Othell M. Simpson
Attorney—Pennie, Edmonds, Morton, Taylor and Adams

[57] ABSTRACT

A tie-down winch for securing to the carrier deck of transporting vehicles loads which offer little frictional resistance to changes in the relative velocity between the load and vehicle. The winch is provided with an energy absorbing component which acts to compensate for any difference in velocity of the two objects in a manner eliminating shock loads. Changes in the energy of the system are transmitted to the energy absorber by linkage means.

10 Claims, 6 Drawing Figures

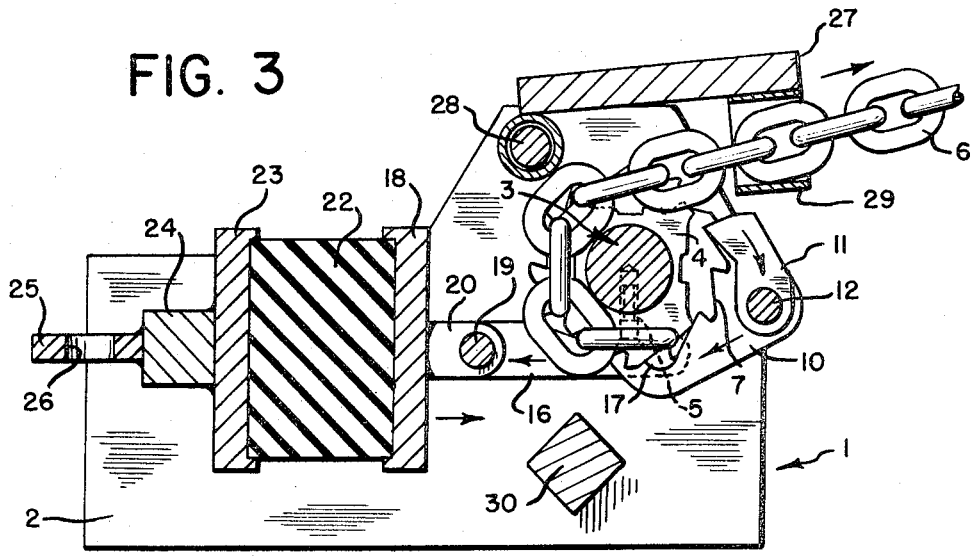
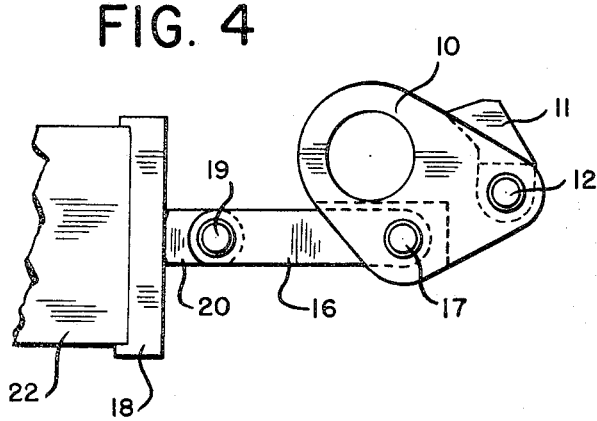
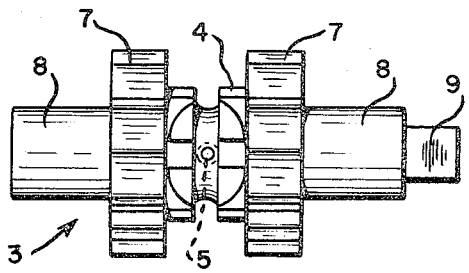
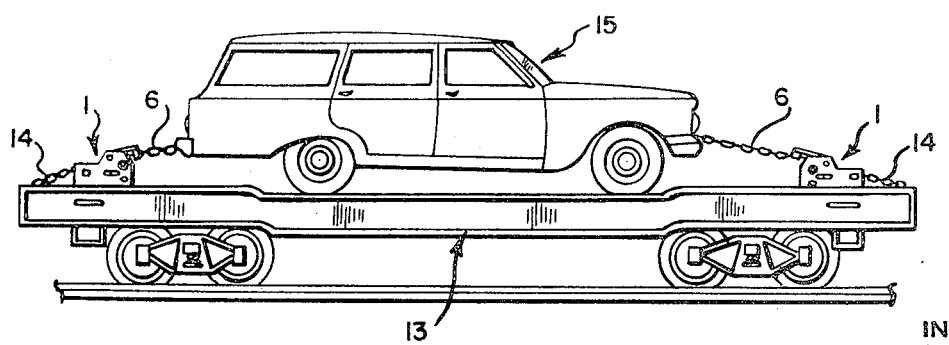

ENERGY ABSORBING TIE-DOWN WINCH

BACKGROUND OF THE INVENTION

During the transportation of loads such as automobiles, trucks, tractors, trailers and other objects which develop relatively little frictional resistance to relative movement between the load and the transporting vehicle, acceleration and deceleration of the latter very often produces a rather large instantaneous velocity differential between the load and the transporting vehicle. The kinetic or inertial energy produced in the load, such as an automobile, by these changes in velocity results in extremely large stresses which build up to a peak value at very rapid rates in the tie-down devices linking the automobile to the transporting vehicle. As a consequence, damage very often results to both the automobile and/or the tie-down device.

Presently available tie-down devices have been generally found to lack the capability of adequately coping with the above described type of loading conditions. The presence of potentially dangerous shock loading, in addition to resulting in rather serious consequences should a failure occur while the device is in service, also severely limits the usefulness and overall life of presently available tie-down units. To maintain the operability of such prior art devices for an economical period of time, regular and time-consuming maintenance is required.

In order to increase the useful life and reduce maintenance costs of conventional tie-down devices, it has been the practice to increase their dynamic loading or shock absorbing capability by simply making the component parts more massive. If weight is a determinative factor, then extra strength is provided by making the component parts from high-grade light-weight materials. In either case, material and production costs are undesirably increased; and in the event more massive materials are used, portability and versatility are sacrificed.

SUMMARY OF THE INVENTION

According to the teachings of the present invention there is provided a tie-down winch of simple and economical construction and one which can be used to anchor a load to a transporting vehicle in such a way that created energy in the winch is absorbed without damage to the winch or load. More particularly, the tie-down winch of this invention is constructed to automatically and gradually compensate for abrupt and rapid changes in the kinetic or inertial energy produced in the load by changes in the relative velocity relative to the transporting vehicle.

In construction, the tie-down winch includes a frame having a rotatable main shaft with a pocket drum mounted centrally thereon for removably receiving one end of a tie-down element, generally in the form of a chain. The chain extends out one end of the winch frame for connection to the load while the winch itself is secured to the carrier by a second chain attached to its other end.

For effecting the proper pre-tensioning of the tie-down chain, a pair of ratchet wheel and pawl assemblies are provided. The ratchet wheels are mounted for rotation on either side of the pocket drum and the free end of each pawl coacts with the teeth of the respective ratchet wheels.

The winch is further provided with an energy absorber which acts to absorb and restore changes in the energy or tension produced in the system by relative changes in the velocity between the load and transporting vehicle. These energy changes are transmitted to and from the energy absorber by linkage means connected directly between the pawl assemblies and the energy absorber. The linkage means includes a pair of spaced apart belcrank and lever assemblies pivotally attached to the opposite ends of the main shaft and on which the pawl members are secured. The belcrank assemblies and pawls are adapted to move as a unit with the ratchet wheels are transmitting changes in energy to the energy absorber. With this construction the tie-down winch absorbs energy when a tension is placed on the chain connecting it to load. When this occurs, as upon acceleration or deceleration of the load relative to the carrier, a rotative force is developed on the pocket drum and also on the ratchet wheels forcing the latter against the pawls. This in turn causes the pawls and belcrank assemblies on which they are mounted to move against the energy absorber.

BRIEF DESCRIPTION OF THE DRAWINGS

FIG. 3 is a cross-sectional view taken along the line 3—3 of FIG. 2;
FIG. 4 is a side elevation view of the linkage assembly for transmitting changes in energy to the energy absorber of the winch.
FIG. 5 is a front elevation view of the ratchet mechanism of the tie-down winch;
FIG. 6 is a diagrammatic view depicting the use of the winch in service.

DETAILED DESCRIPTION OF THE INVENTION

Figure 1:
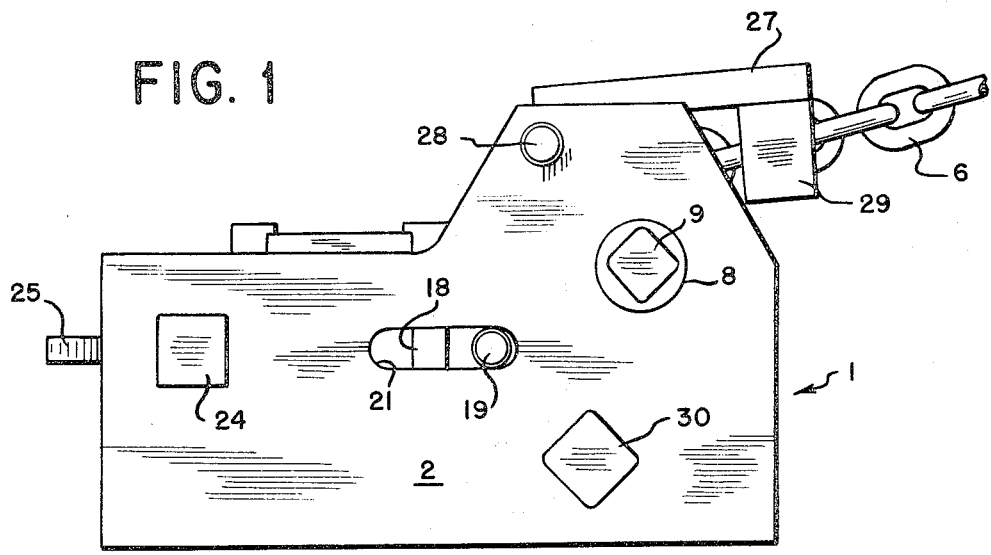
FIG. 1 is a side elevational view of the tie-down winch.

As shown in the drawings, the tie-down winch of this invention, generally shown at 1, comprises a frame having two upstanding side plates 2 between which a main supporting shaft 3 is rotatably connected. The main shaft, shown separately in FIG. 5, includes a central pocket drum 4 having an outwardly extending pin member in the form of a screw 5 for receiving one end of a tie-down chain 6 as more fully described below. Ratchet wheels 7 are fixed to the shaft on either side of the pocket drum. Outwardly of these wheels, the shaft includes bearing surfaces 8 for rotatably supporting it in suitable holes in the plates 2. One end of the shaft projects outwardly of the side plates and is provided with a square head 9 which may be gripped by a wrench to rotate the shaft as more fully described below.

Figure 2:
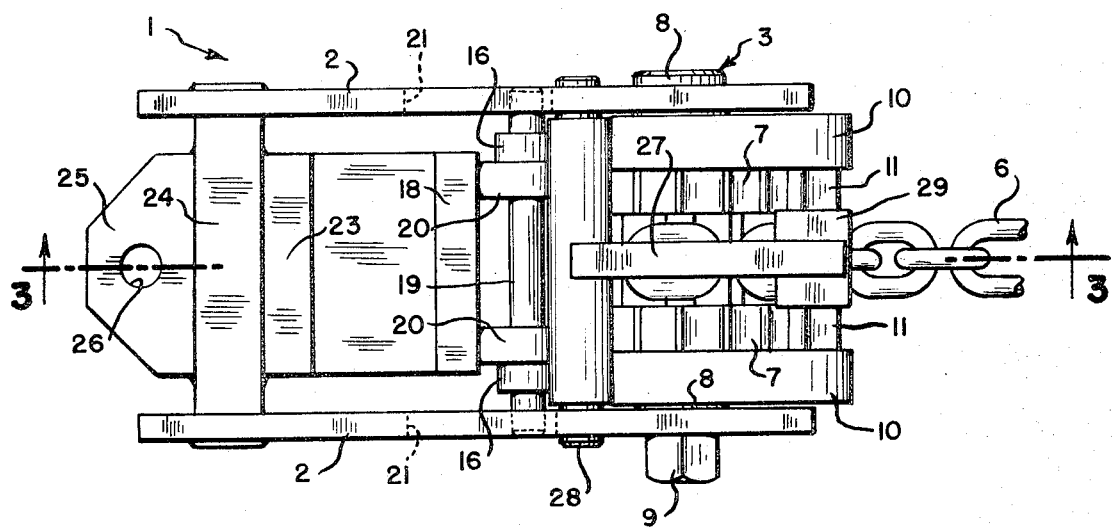
FIG. 2 is a top plan view of the tie-down winch.

A pair of belcrank members 10 are journaled on the shaft 3, one adjacent each of the rachet wheels 7 and axially outwardly thereof. The shaft 3 is free to rotate in the belcranks. Pawl members 11 are pivotally connected to the belcranks by means of a support pin 12 passing through suitable holes in the belcranks. As shown in FIG. 2, the pawls are aligned to cooperate with the ratchet wheels 7.

As shown in FIG. 6, one end of the tie-down winch 1 is adapted to be connected to the load carrying vehicle 13 by an anchor chain 14 while the tie-down chain 6 is connected between the pocket drum of the winch and the load, such as an automobile 15. Two winches are advantageously used, one at either end of the automobile. In accordance with the teachings of the present invention the tie-down winch is provided with an energy absorbing system for reducing the shock loads applied to the tie-down chains and to the load during movement of the load relative to the carrier.

As shown in FIG. 4, a lever 16 is connected to one end of each of the belcranks by a pin 17 extending between the belcranks. Each level is free to pivot about pin 17. The other end of each of the levers is connected to a pressure plate member 18 by means of a support pivot pin 19 fixed to bosses 20 on the plate 18. The pivot pin 19 extends through the bosses of the pressure plate and through slots 21 in the side plates 2.

The pressure plate encloses a portion of one end of a resiliently compressible energy absorbing member 22 and is attached thereto by suitable adhesive of by vulcanizing. In the preferred construction the energy absorbing member is a high-force low deflection elastomer. As an alternative construction, the energy absorbing member may be comprised of springs, diaphams of other forms of energy absorbing and storing devices. The left hand end of the energy absorbing member, as viewed in FIG. 3, is partially enclosed by a back plate 23. The back plate is in turn welded to a cross bar 24, the ends of which are welded or otherwise secured to the side plates 2 of the winch. A connector plate 25 is welded to the backup cross bar and provided with an aperture 26 by which the anchor chain 14 may be connected.

When the winch is used, an anchor chain is connected to the plate 25 and a tie-down is connected to pocket drum 4 of the main shaft 3. To permit the tie-down chain to assume various tangential positions relative to the pocket drum as the latter is rotated to wind the chain thereabout, a chain guide 27 is provided. The chain guide is pivotally mounted on a pin 28 and at its free end is provided with a depending ring member 29 through which the chain is passed. The chain guide not only maintains the chain tangentially aligned with the pocket drum but also maintains it in alignment axially of the pocket drum. During use of the winch and creation of increased tension in the tie-down chain as more fully described below, the belcrank members will be rotated about the shaft 3 in a clockwise direction as viewed in FIG. 3. To provide a limit to this rotational movement, a cross bar stop 30 is welded between the side plates 2 at a location underneath the belcranks.

In operation, the tie-down winch, as shown in FIG. 6, is mounted on the carrier deck of the transporting vehicle 13 and is flexibly but firmly secured thereto by the chain 14 passing through the aperture in connector plate. A tie-down chain 6 is then attached at one end to the pocket drum of a winch and the other free end of the chain attached to the front or rear end of the automobile by a suitable hook. Another tie-down winch is then connected in the same manner to the other end of the automobile.

After attachment of the winches, the shaft 3 of each is rotated to produce an initial tension in each of the tie-down chains. When the desired pre-tension has been achieved, the free ends of pawls 11 are pivoted into engagement with the appropriate teeth of the respective ratchet wheels 7 to prevent reverse rotation of the ratchet wheels relative to the pawls. The ratchet wheels and pawls can, however, rotate as a unit with the belcranks, this reverse direction being clockwise as viewed in FIG. 3.

With this tensioning of the tie-down chain, the shaft 3 is urged to rotate in a clockwise direction as viewed in FIG. 3. This puts a load on the teeth of each ratchet wheel which is transmitted directly to its coacting pawl which, in turn, transmits the force to the pressure plate 18 and energy absorbing member 22 via the linkage assembly comprising the belcranks 10 and levers 16. The extension of pivot pin 19 through slots 21 in side plates 2 prevents vertical movement of the pin and accordingly the pin is constrained to linear motion in a direction substantially perpendicular to its axis of pivot and perpendicular to the energy absorbing member. The pressure plate 18 exerts a force of the energy absorbing member 22 which is directly proportional to the load on the ratchet teeth; and since the energy absorbing member is solidly supported by cross bar 24, the application of this force by the pressure plate 18 produces a proportional initial deflection or deformation of the energy absorbing member.

During transportation, acceleration and deceleration of the transporting vehicle will cause a velocity differential to arise between the automobile and the transporting vehicle, the magnitude of the force thereby created on the tie-down winch being proportional to the rate of acceleration or deceleration. The inertia of the automobile as a result of the change in velocity of the transporting vehicle will tend to rotate the shaft 3 and ratchet wheels 7 clockwise in FIG. 3. Through the pawls 11, this will cause rotation of the belcranks 10 about the shaft 3. As described above, such rotation will, via the levers, transmit the created energy to the absorbing member 22 and cause a deformation thereof directly proportional to the transmitted force. When the velocities of the automobile and transporting vehicle are once again matched, the absorbed energy stored in the energy absorber will exert a force tending to rotate the shaft 3 in a counterclockwise direction as viewed in FIG. 3; and this force exerted on the tie-down chain 6 will move the automobile back to its initial position.

From the above, it will be apparent that under transit conditions, the energy absorbing tie-down winch of the invention will act to accelerate or decelerate the automobile to match the change in velocity of the transporting vehicle and will do so at a sharply reduced rate of loading on both the winch and the automobile. Thus, it will be seen that with the tie-down energy absorbing winch of this invention, rapid build-up of damaging shock loads on the automobile or on the tie-down winch are virtually eliminated. Furthermore, the forces developed during a change in velocity of the transporting vehicle are transmitted via the linkage meanS to the component of the winch best suited and intended specifically for this purpose; namely, the energy absorbing member. Therefore, potentially dangerous loading on other components of the winch are advantageously reduced and minimized.

The above description of the present invention has been made with reference to the preferred embodiment; however, it is to be understood that various changes may be made thereto without departing from the scope of the invention as set forth in the following claims.

I claim:
1. An energy absorbing tie-down winch comprising
   a. a frame;
   b. incremental tensioning means mounted on said frame for movement relative thereto and having first and second cooperatively engaging members, said first member being movably in one direction relative to the second member to tension a tie-down chain connected to said first member; and
   c. energy absorbing means connected to the second member of said incremental tensioning means for resiliently opposing movement of said tensioning means in a direction opposite said one direction upon an increase in tension in said tie-down chain.
2. An energy absorbing tie-down winch according to claim 1 wherein:
   a. said incremental tensioning means comprises a pawl and ratchet mechanism with the ratchet defining said first member.
3. An energy absorbing tie-down winch according to claim 1 wherein said incremental tensioning means comprises:
   a. a shaft supported for rotation on said frame;
   b. means on said shaft for securing said tie-down chain for wrapping about said shaft upon rotation thereof in said one direction;
   c. at least one ratchet wheel fixed to said shaft for rotation therewith, said ratchet wheel defining the first member of the tensioning means; and
   d. a pawl for each of said ratchet wheels for preventing movement of said ratchet relative to said pawl in a direction opposite said one direction, said pawl defining the second member of the tensioning means.
4. An energy absorbing tie-down winch according to claim 3 wherein:
   a. said energy absorbing means includes a resiliently compressible member.
5. An energy absorbing tie-down winch comprising:
   a. a frame;
   b. incremental tensioning means mounted on said frame for movement relative thereto and comprising:
      1. a shaft supported for rotation on said frame,
      2. means on said shaft for securing a tie-down chain for wrapping about said shaft upon rotation thereof in one direction,
      3. at least one ratchet wheel fixed to said shaft for rotation therewith in said one direction to tension said tie-down chain,
      4. a pawl for each of said ratchet wheels for preventing movement of said ratchet relative to said pawl in a direction opposite said one direction, and
   c. energy absorbing means connected to said pawl for resiliently opposing movement of said tensioning means in a direction opposite said one direction upon an in- crease in tension in said down chain, said energy absorbing means including:
1. a resiliently compressible member,
2. a bell crank member for each pawl rotatably mounted on said shaft,
3. means on each of said bell crank for supporting one of said pawls, and
4. linkage means for each of said bell crank connected at one end to said bell crank and at its other end to said energy absorbing means.

6. An energy absorbing tie-down winch according to claim 5 wherein:
   a. said energy absorbing member is mounted on said frame for linear movement upon compression thereof; and
   b. said linkage means is rotatably connected at its opposite ends to said belcrank and energy absorbing member.

7. An energy absorbing tie-down winch according to claim 6 wherein:
   a. pivot pin means is included for pivotally connecting said linkage to said energy absorbing means, said pivot pin means being supported by said frame for linear movement perpendicular to the pivot axis thereof.

8. An energy absorbing tie-down winch according to claim 7 wherein:
   a. said frame includes two plate members; and
   b. said shaft is rotatably supported between said plate members and includes:
      1. a centrally disposed pocket drum defining the means to which said tie-down chain is adapted to be connected, and
      2. two of said ratchet wheels fixed thereto axially outwardly of said pocket drum.

9. An energy absorbing tie-down winch according to claim 8 wherein:
   a. said plates each include a slot which the opposite ends of the pivot pin means are supported for linear movement.

10. An energy absorbing tie-down winch according to claim 9 further including:
   a. tie-down chain guide means pivotally connected to said frame for pivoting movement about an axis parallel to the axis of rotation of said shaft and having a tie-down chain receiving opening axially aligned with said pocket drum.

* * * * *